United States Patent [19]

Nattel

[11] Patent Number: 4,642,420
[45] Date of Patent: * Feb. 10, 1987

[54] FORMED METALLIC WIRING BOX

[75] Inventor: William Nattel, Montreal, Canada

[73] Assignee: Commander Electrical Materials, Inc., Quebec, Canada

[*] Notice: The portion of the term of this patent subsequent to Jul. 16, 2002 has been disclaimed.

[21] Appl. No.: 753,226

[22] Filed: Jul. 9, 1985

Related U.S. Application Data

[63] Continuation-in-part of Ser. No. 494,832, May 16, 1983, Pat. No. 4,529,834.

[51] Int. Cl.⁴ .............................................. H02G 3/08
[52] U.S. Cl. ...................................... 174/53; 220/3.2; 411/437
[58] Field of Search ................... 174/53; 220/3.2–3.94; 411/437

[56] References Cited

U.S. PATENT DOCUMENTS 3,526,703  9/1970  Tucker .................................. 174/53
4,315,100  2/1982  Haslbeck et al. ................. 174/53 X
4,529,834  7/1985  Nattel .................................... 174/53

Primary Examiner—Arthur T. Grimley
Assistant Examiner—David A. Tone
Attorney, Agent, or Firm—Larson and Taylor

[57] ABSTRACT

A sheet metal, electrical wiring box having integral wiring device attachment means on its end walls. Each attachment means comprises a base plate bent outwardly from an end wall and flexible leg plates extending downwardly and inwardly toward each other from the ends of the base plate. Each leg plate ends in a partially threaded foot portion. The foot portions face each other and form an aperture through which a fastening screw, for the wiring device, can be pushed. The fastening screw is freely inserted down through an aperture in the base plate and pushed through the aperture between the foot portions on the leg plates when attaching the wiring device to the box. The flexible leg plates cause the partially threaded foot portions to bear against the screw. Rotation of the inserted screw draws the leg plates up tight against the base plate to securely lock the screw and the wiring device to the box.

3 Claims, 6 Drawing Figures

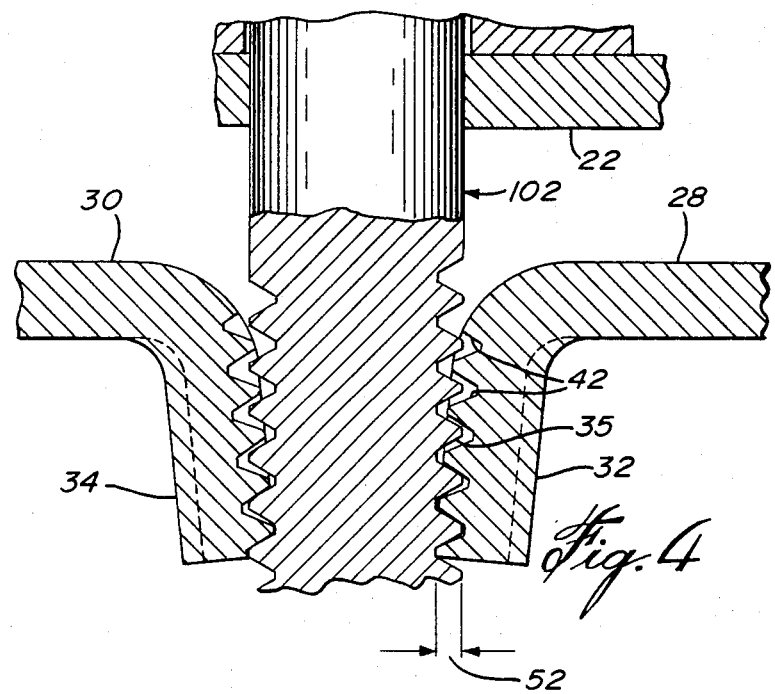
Fig. 4
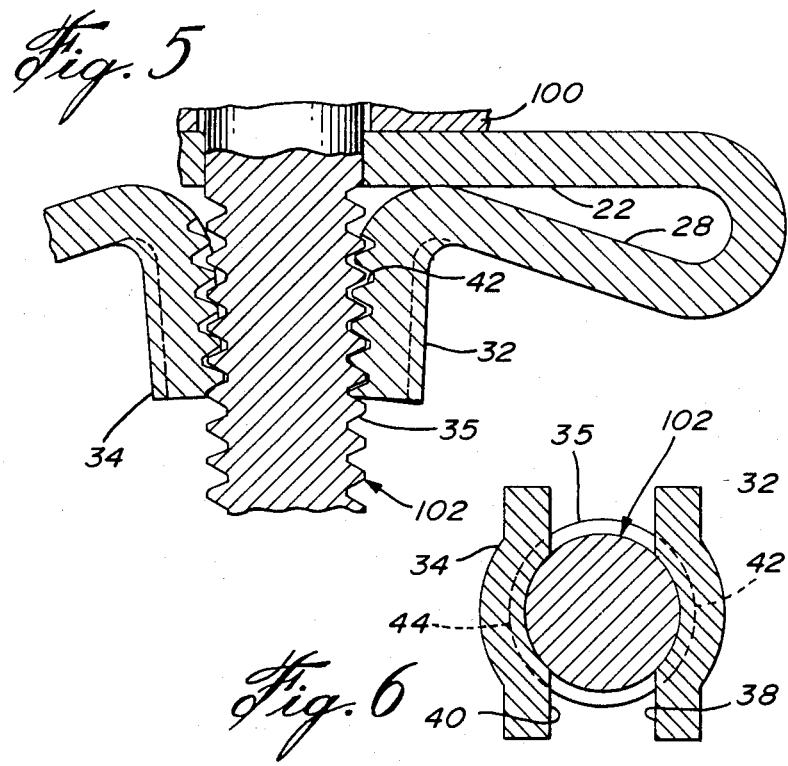
Fig. 5
Fig. 6

FORMED METALLIC WIRING BOX

CROSS-REFERENCE TO RELATED APPLICATIONS

This application discloses and claims subject matter related to co-pending application Ser. No. 494,832 filed May 16, 1983 now U.S. Pat. No. 4,529,834 issued July 16, 1985. and assigned to the assignee of the present invention. This application is also a continuation-in-part of application Ser. No. 494,832, filed May 16, 1983, now U.S. Pat. No. 4,529,834.

BACKGROUND OF THE INVENTION

This invention relates to electrical wiring box structures. More particularly, it is connected with a formed metallic electrical wiring device having integral wiring device mounting means.

Numerous methods have been disclosed in the prior art for attaching the mounting screw of an electrical wiring device to the wall structure of an electrical wiring box. In the caseof wiring boxes formed of plastic or other moldable materials, mounting methods have been disclosed which depend either upon a threaded screw opening in the box wall structure or a screw engaging metal insert which mates with the box wall. The former arrangement is not desirable because of the ease with which the threads formed in the plastic box wall become stripped. In the latter arrangement, the provision of a metallic insert adds to the overall cost of the box and the installation time. Many of these schemes provide, however, for the easy push-insertion of the wiring device mounting screw during installation.

In the case of wiring boxes fabricated of metal, it has been the common practice in the trade to simply form threads in the wall structure of the wiring box. In such metal wiring boxes, typically no provision is made for the rapid push-insertion of the wiring device mounting screw, and the mounting screw must be inserted by the time consuming action of turning the full length of the screw into the threaded opening.

In any event, it would not be obvious to modify the box in some manner to provide for push-insertion of the wiring device mounting screw since push-insertion mounting normally requires high resiliency in the mounting device to have the mounting screw threads engaged. Metal wiring boxes are normally made from commercial quality, low-carbon, cold-rolled steel and thus do not have a high degree of resiliency.

SUMMARY OF THE INVENTION

It is therefore an object of the present invention to provide a metallic electrical wiring box, made from low-carbon, cold-rolled steel, having integral mounting means for an electrical wiring device which permits the rapid push-insertion of the device mounting or fastening screw.

It is a further object of this invention to provide a metal electrical wiring box, made from low-carbon, cold-rolled steel having an integral device mounting means, easily fabricated in one piece by metal stamping and forming operations.

This and other objects, advantages and capabilities are achieved by low-carbon, cold-rolled steel electrical wiring boxes in accordance with the present invention which comprise a metal wall structure including first and second side wall portions, first and second end wall portions, and a rear wall portion therebetween which form a chamber to receive a wiring device. Each of the first and second endwall portions of the wiring box have wiring device attachment means integral therewith for receiving the mounting screw of a wiring device mounted in the box chamber.

The wiring device attachment means comprise a flat portion bent or formed substantially at right angles to the endwall portion of the wiring box and provided with an aperture to receive the mounting screw of the wiring device. First and second resiliently flexible opposed leg portions are attached to the flat portion, with the leg portions being bent downwardly along the endwall portion of the wall structure.

The first and second leg portions terminate in first and second opposed foot portions adapted to contact the wiring device mounting screw inserted through the screw receiving aperture and passing between the opposed leg portions. The opposed leg portions are adapted to flex apart to permit the facile insertion of the mounting screw between the opposed foot portions, but to urge the foot portions toward one another to engage the mounting screw and prevent its easy removal.

Because of the low resiliency of the box material, the foot portions are not tightly urged against the screw. Thus to ensure that there is sufficiently initial surface contact between the foot portions and the mounting screw to tighten the screw between the foot portions after it is inserted therebetween, the foot portions are formed to wrap part way around the mounting screw, and also to have a minimum number of threads.

If the leg portions are bent too much during insertion of the mounting screw, they may not return enough to contact the screw. Over-bending could occur if the mounting screw is inserted crookedly and pushes down against one leg portion instead of passing in the gap between them. To avoid overbending, a movement limiting stop is provided on the endwalls of the wiring box just beneath each leg portion. Each stop prevents its associated leg portion from being overbent.

BRIEF DESCRIPTION OF THE DRAWING FIGURES

FIG. 4 is a view similar to FIG. 2 with the mounting screw partially tightened;

FIG. 5 is a view similar to FIG. 2 with the mounting screw fully tightened; and

FIG. 6 is a cross-section view taken along line 6—6 of FIG. 3.

DETAILED DESCRIPTION

Figure 1:
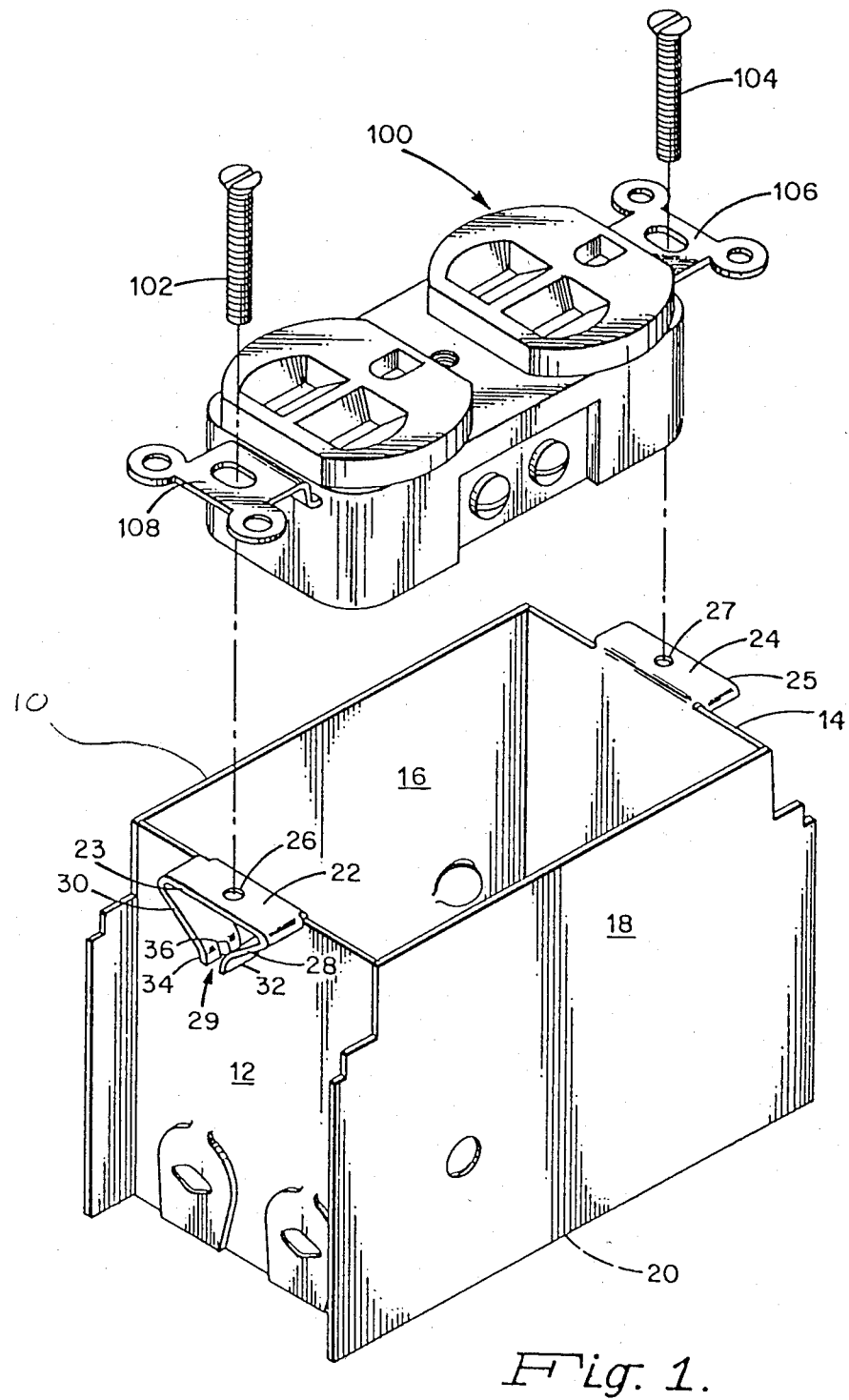
FIG. 1 is an exploded perspective view of a wiring box in accordance with the present invention showing a double outlet device with mounting screws.

Referring to FIG. 1 there is shown an electrical wiring box 10 in accordance with one aspect of the present invention, together with a typical double receptical electrical outlet device 100 with mounting screws 102 and 104.

The wiring box 10 is formed from commercial quality, low-carbon, cold-rolled steel by conventional metal stamping and forming techniques with endwall portions 12 and 14 and sidewall portions 16 and 18. A rear wall 20 connects the side- and endwall portions to form the box structure providing an opening or chamber adapted to receive a wiring device such as doublet outlet device 100 or a switch device (not shown).

Each endwall portion of the wiring box 10 has a portion for receiving and engaging the mounting screws of the wiring device 100. For example, endwall 12 has a portion 23 integrally formed with the endwall for receiving and engaging mounting screw 102 of the wiring device 100. In a similar manner, endwall 14 of the wiring box 10 has a portion 25 for receiving and engaging mounting screw 104.

The mounting screw engaging portions of the box wall structure have a flat portion, for example 22, bent substantially at right angles to the box endwall, and drilled or punched to provide an opening or aperture 26. The aperture 26 is formed slightly larger than the standard outside diameter of wiring device mounting screws to permit the easy insertion of the screw through the opening 26.

The screw engaging portions of the box endwall have opposed flexible and resilient leg portions 28 and 30 which are integrally attached to the flat portion 22 and are folded downwardly along the endwall 12 of the box 10. The leg portions 28 and 30 terminate in opposed foot portions 32 and 34.

The inner face of each foot portion is threaded as at 36 in FIG. 1 to more firmly engage the wiring device mounting screw 102. As more clearly shown in FIGS. 2 to 6, the inner faces 38, 40 of the foot portions 32, 34 are provided with a plurality of threads 42, 44. At least three threads, and preferably four to six, are provided on each foot portion. The threads 42, 44 are formed in the inner faces 38, 40 of the foot portions 32, 34 so that they partly wrap around the mounting screw. The threads 42, 44 can each be formed so that they cover between one-sixth and two-sixths of the circumference of the mounting screw 102 as shown in FIG. 6. Preferably, each thread encircles about one-quarter of the circumference of the mounting screw 102. If less than one-sixth of the circumference of the screw is covered by the threads, there may not be enough surface contact between the threads on the mounting screw and the threads 42, 44 to draw the leg portions 28, 30 upwardly when the mounting screw is turned. If more than two-sixths of the circumference of the screw is covered by the threads, the screw threads could push or bend the leg portions 28, 30 down past their elastic limit.

The opposed leg portions 28 and 30 of the screw engaging portions of the box endwall 12 are formed to provide a gap or spacing 29 between the opposed foot portions 32 and 34 which is slightly less than the standard outside diameter of wiring device mounting screws. Insertion of the mounting screw 102 through aperture 26 and between opposed leg portions 28 and 30 thus causes the threads of the mounting screw to contact the opposed foot portions 32 and 34. The opposed leg portions 28 and 30 freely flex or move apart from one another to permit the easy push-insertion of the mounting screw 102. The opposed foot portions 32 and 34 continually contact the mounting screw as it is inserted by pushing, the threaded inner faces 38, 40 of the opposed foot portions 32 and 34 ratcheting along the threads 35 of the mounting screw.

Figure 2:
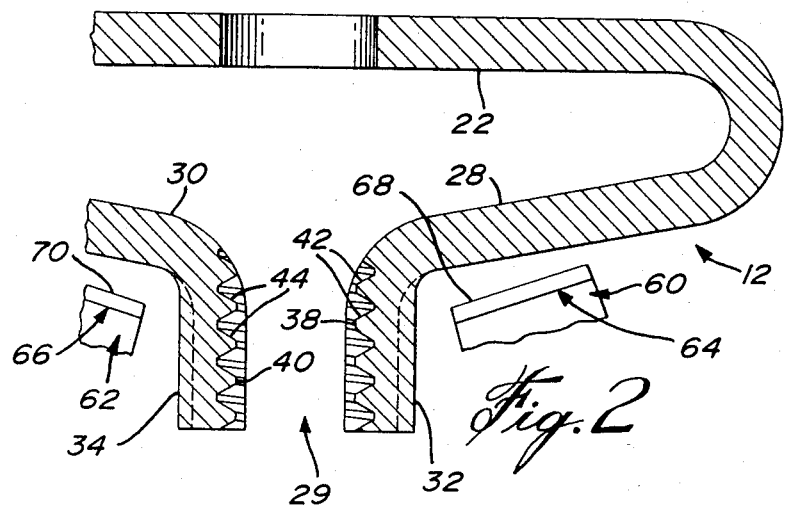
FIG. 2 is a partial cross-section view of the wiring box showing a leg portion before insertion of a wiring device mounting screw.

The functioning of the screw engaging portions of the box endwall structure can be easily seen by referring to FIGS. 2 to 5 in which the same numerals are used to designate corresponding elements. In FIG. 2 the structure of the screw engaging portion 23 of the box endwall 12 is shown prior to insertion of the wiring device mounting screw. Leg portions 28 and 30 are shown formed downwardly from flat portion 22 along box wall 12. In a preferred embodiment of the present invention, the leg portions 28 and 30 may be substantially flat, being bent downward along the wiring box endwall to form acute angles with the flat portion 22 as shown in FIG. 2. Alternately, leg portions 28 and 30 may be folded to form curved leg portions having an S-shape or ogee curve. The foot portions 32 and 34 are spaced apart to have the gap indicated by 29, between threads 42, 44 slightly less than the diameter of mounting screw 102.

Figure 3:
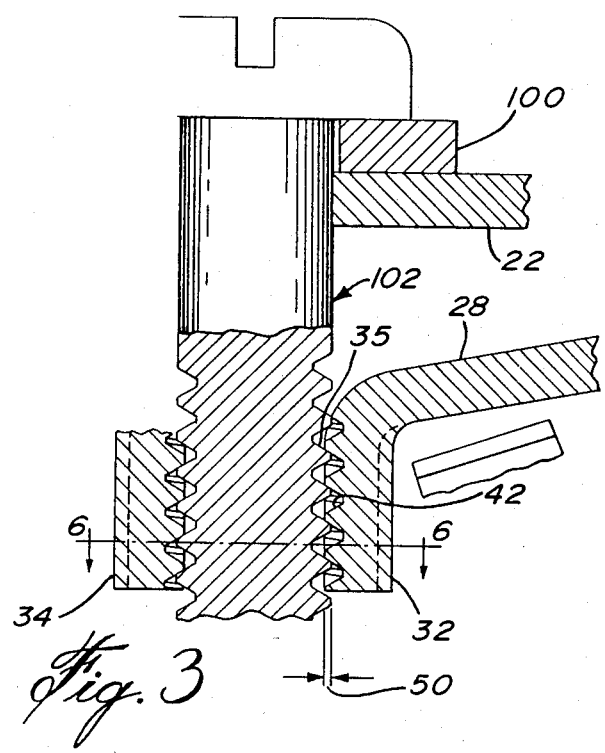
FIG. 3 is a view similar to FIG. 2 with the mounting screw initially inserted.

FIG. 3 shows mounting screw 102 after insertion through the electrical device 100 and the opening in flat portion 22 and between the opposed foot portions 32 and 34. Leg portions 28 and 30 have flexed apart from one another to permit the easy insertion of the mounting screw 102, but the resilience of the leg portions provides a restoring force which urges the opposed foot portions 32 and 34 toward one another, to have their threads 42, 44 abut the mounting screw 100. The threads 42, 44 lightly abut screw 102 but because of their minimum number and their partial wrap-around, there is sufficient contact between the threads 42, 44 and screw 102 that rotation of the screw 102 will draw the threads 42, 44 upwardly and closer. Little turning effort is required initially at this time. As screw 102 is turned, the torque overcomes the low bending resistance of the leg portions 28 and 30 and they move upwardly to a horizontal position as shown in FIG. 4. The threads 42, 44 and screw threads 35 now have a much greater overlap 52. Quite a large turning torque is now required to overcome the compressive force exerted by the horizontal leg portions 28 and 30.

Continued turning of the screw 102 causes the leg portions 28 and 30 to continue to move up past the horizontal until they abut the underside of flat portion 22 as shown in FIG. 5. In this position, the threads 42, 44 tightly abut on the screw 102 through compressive force to securely hold the screw 102, and this electrical device 100, in place.

A movement limiting stop 60, 62 is provided under each leg portion 28, 30. Each stop 60, 62 preferably comprises a tab 64, 66 punched out of the endwall 12 of the electrical box 10 and bent outwardly. The tabs 64, 66 are located just under their respective leg portions 28, 30 and adjacent the foot portions 32, 34. Each tab 64, 66 is angled slightly so that its top edge 68, 70 is generally parallel to the leg portion 28, 30 when the leg portion abuts it. The tabs 64, 66 limit the downward movement of the respective leg portions 28, 30 so that they are not inadvertently overbent if directly pushed on by the mounting screw 102 when it is being inserted in the gap 29.

Wiring boxes in accordance with the present invention can be easily fabricated from a continuous metal strip and in a stamping press having multiple stations for the various forming and stamping operations. Thus, wiring boxes in accordance with the present invention have integral one-piece structure, including a wiring device mounting means which permits easy and quick push insertion, of the fastening screws and firm mounting of the wiring device.

While there have been shown and described what are at present believed to be the preferred embodiments of the present invention, it will be clear to one skilled in the art to which this invention pertains that various changes and modifications may be made therein without departing from the scope of the invention as defined by the appended claims.

The embodiments of the invention in which an exclusive property or privilege is claimed are defined as follows:

1. A resilient, sheet metal, electrical wiring box comprising: an integral metal wall structure having four side walls and a bottom wall, each side wall having side edges, and first and second end edges; the side walls joined together along their side edges, and the bottom wall joined to the side walls along the first end edges to form a chamber to receive a wiring device; two opposed side walls each having a wiring device attachment means integral therewith for receiving the threaded mounting member of a wiring device to be mounted in said box chamber; said wiring device attachment means comprising:

a rectangular base plate fixed along one long side to the second edge of the side wall and extending at right angles to the side wall, said base plate having a first centrally located, mounting member receiving aperture slightly larger than the outside diameter of the mounting member of the wiring device but smaller than the head of the mounting member;

first and second, generally rectangular, resiliently flexible, leg plates, the first leg plate joined at one narrow end to a first short side of the base plate, the second leg plate joined at one narrow end to the second short side of the base plate, the first and second leg plates extending down the outside of the sidewall to have their other narrow ends located adjacent each other and spaced below the first aperture in the base plate;

the first and second leg plates terminating in first and second opposed foot portions, said foot portions forming a second aperture through which said wiring device mounting member can be inserted, said foot portions provided with thread engaging means for contacting said mounting member, said thread engaging means comprising at least three threads formed on each foot portion;

said opposed leg plates adapted to flex apart to permit the facile insertion of the threaded mounting member between the opposed foot portions without turning, and adapted to urge the opposed foot portions toward one another to have the thread engaging means engage the mounting member, wherein the foot portions wedge themselves tightly against the mounting member when the mounting member is turned to have the leg plates contact the base plate.

2. A resilient, sheet metal, electrical wiring box comprising: an integral metal wall structure having four side walls and a bottom wall, each side wall having side edges, and first and second end edges; the side walls joined together along their side edges, and the bottom wall joined to the side walls along the first end edges to form a chamber to receive a wiring device; two opposed side walls each having a wiring device attachment means integral therewith for receiving the threaded mounting member of a wiring device to be mounted in said box chamber; said wiring device attachment means comprising:

a rectangular base plate fixed along one long side to the second edge of the side wall and extending at right angles to the side wall, said base plate having a first centrally located, mounting member receiving aperture slightly larger than the outside diameter of the mounting member of the wiring device but smaller than the head of the mounting member;

first and second, generally rectangular, resiliently flexible, leg plates, the first leg plate joined at one narrow end to a first short side of the base plate, the second leg plate joined at one narrow end to the second short side of the base plate, the first and second leg plates extending down the outside of the sidewall to have their other narrow ends located adjacent each other and spaced below the first aperture in the base plate;

the first and second leg plates terminating in first and second opposed foot portions, said foot portions forming a second aperture through which said wiring device mounting member can be inserted, said foot portions provided with thread engaging means for contacting said mounting member, and wherein said first and second foot portions are spaced apart by a distance less than the outside diameter of said wiring device mounting screw, said thread engaging means comprising threads on each foot portion which cover between one-sixth and two-sixths of the circumference of the mounting screw;

said opposed leg plates adapted to flex apart to permit the facile insertion of the threaded mounting member between the opposed foot portions without turning, and adapted to urge the opposed foot portions toward one another to have the thread engaging means engage the mounting member, wherein the foot portions wedge themselves tightly against the mounting member when the mounting member is turned to have the leg plates contact the base plate.

3. A resilient, sheet metal, electrical wiring box comprising: an integral metal wall structure having four side walls and a bottom wall, each side wall having side edges, and first and second end edges; the side walls joined together along their side edges, and the bottom wall joined to the side walls along the first end edges to form a chamber to receive a wiring device; two opposed side walls each having a wiring device attachment means integral therewith for receiving the threaded mounting member of a wiring device to be mounted in said box chamber; said wiring device attachment means comprising:

a rectangular base plate fixed along one long side to the second edge of the side wall and extending at right angles to the side wall, said base plate having a first centrally located, mounting member receiving aperture slightly larger than the outside diameter of the mounting member of the wiring device but smaller than the head of the mounting member;

first and second, generally rectangular, resiliently flexible, leg plates, the first leg plate joined at one narrow end to a first short side of the base plate, the second leg plate joined at one narrow end to the second short side of the base plate, the first and second leg plates extending down the outside of the sidewall to have their other narrow ends located adjacent each other and spaced below the first aperture in the base plate, the first and second leg plates terminating in first and second opposed foot portions, said foot portions forming a second aperture through which said wiring device mounting member can be inserted, said foot portions provided with thread engaging means for contacting said mounting member; and a movement limiting stop on the endwall of the box just under each leg portion to limit the downward movement of the leg portion so that it can maintain contact with the mounting member;

said opposed leg plates adapted to flex apart to permit the facile insertion of the threaded mounting member between the opposed foot portions without turning, and adapted to urge the opposed foot portions toward one another to have the thread engaging means engage the mounting member, wherein the foot portions wedge themselves tightly against the mounting member when the mounting member is turned to have the leg plates contact the base plate.

* * * * *